United States Patent [19]
Kojima et al.

[11] Patent Number: 5,281,978
[45] Date of Patent: Jan. 25, 1994

[54] OBJECT CARRIAGE SYSTEM

[75] Inventors: Yoshiaki Kojima; Yasumitsu Wada, both of Tsurugashima, Japan

[73] Assignee: Pioneer Electronic Corporation, Tokyo, Japan

[21] Appl. No.: 786,294

[22] Filed: Nov. 1, 1991

[30] Foreign Application Priority Data

Feb. 26, 1991 [JP] Japan .................................. 3-30966

[51] Int. Cl.⁵ .............................................. H04N 1/21
[52] U.S. Cl. ..................................... 346/108; 346/139 R
[58] Field of Search ............... 346/108, 76 L, 160, 346/139 R

[56] References Cited

U.S. PATENT DOCUMENTS 4,967,293 10/1990 Aruga et al. .................. 360/106

*Primary Examiner*—Mark J. Reinhart
*Attorney, Agent, or Firm*—Perman & Green

[57] ABSTRACT

An object carriage system is developed which can suppress any vibration even if an object to be carried contains a source of vibration. The object carriage system comprises a carriage for carrying an object, a resilient supporting means for resiliently supporting the carriage over the floor, a vibration suppressing means for suppressing the vibration of the carriage relative to the floor, acceleration detecting means for detecting an acceleration of the carriage and producing a corresponding acceleration signal, a mass movably supported by the carriage, and driving means for driving the mass in the direction in which the acceleration takes place in accordance with the acceleration signal.

3 Claims, 6 Drawing Sheets

ACCELERATION CHARACTERISTIC OF CARRIAGE DURING ACTUATION OF LINEAR MOTOR

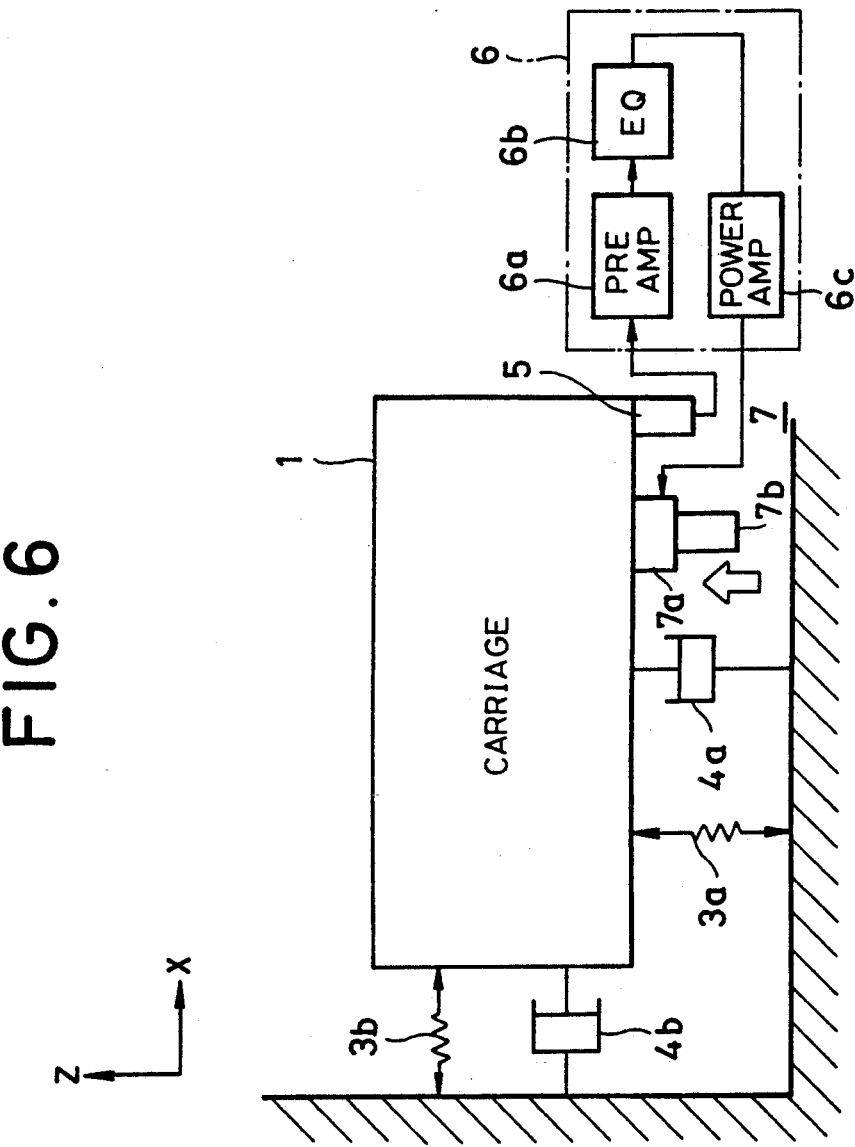

OBJECT CARRIAGE SYSTEM

BACKGROUND OF THE INVENTION

1. Field of the Invention

The present invention relates to an object carriage system for carrying an object such as a precision machining device while eliminating external vibrations.

2. Description of the Prior Art

An object carriage system is known having a resilient supporting means for resiliently supporting over the floor a carriage which carries an object, e.g. a precision machining device or an optical disk laser cutting device, and a vibration suppressing means for suppressing a vibration of the carriage relative to the floor.

Such a prior art object carriage system as shown in FIG. 1 has a carriage 1 which is to carry an object, resiliently supported by resilient supporting means or pneumatic springs 3a and 3b disposed on the floor and the wall respectively and also, urged by vibration suppressing means for dampers 4a and 4b for suppressing vibrations. When external vibrations are exerted from the floor 2 to the carriage 1 in the Z direction, the resulting vibrations on the carriage 1 will be attenuated by means of a mass m1 of the carriage 1 and an attenuation coefficient c0 of the damper 4a. Also, the vibration in the X direction of FIG. 1 will be suppressed by means of the damper 4b.

However, if a source of vibration exists in the object per se carried by the carriage, the prior art object carriage system can hardly avoid vibrations derived from the particular source. More specifically, vibrations caused by e.g. a spindle motor of an optical disk laser cutting device cannot be suppressed thus increasing an error in the positioning of an optical information writing point.

SUMMARY OF THE INVENTION

It is an object of the present invention to provide an improved object carriage system capable of suppressing vibrations on an object even if the object carried thereon contains a source of vibration.

An object carriage system according to the present invention which has a carriage for carrying an object, resilient supporting means for resiliently supporting the carriage over the floor, and vibration suppressing means for suppressing the vibrations of the carriage relative to the floor, comprises acceleration detecting means for detecting an acceleration of the carriage and producing a corresponding acceleration signal, a mass movably supported by the carriage, and driving means for driving said mass in the same direction as the acceleration in accordance with said acceleration signal.

In operation, the object carriage system of the present invention can suppress vibrations through detecting an acceleration caused by the vibrations on a carriage which carries an object and actuating a mass movably supported by the carriage to move in the same direction as the acceleration with a force corresponding to the acceleration so that the carriage is urged by a counter-force which is oriented opposite to the acceleration.

BRIEF DESCRIPTION OF THE DRAWINGS

FIG. 6 is a schematic view showing another embodiment of the present invention.

DETAILED DESCRIPTION OF PREFERRED EMBODIMENTS

Figure 1:
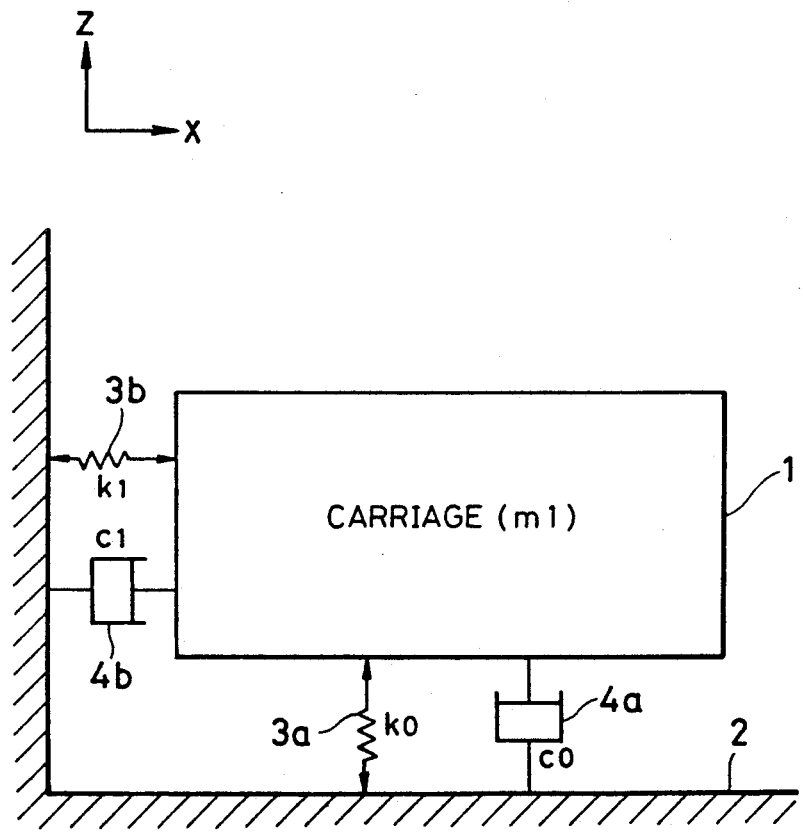
FIG. 1 is a schematic view of a prior art object carriage system.
Figure 2:
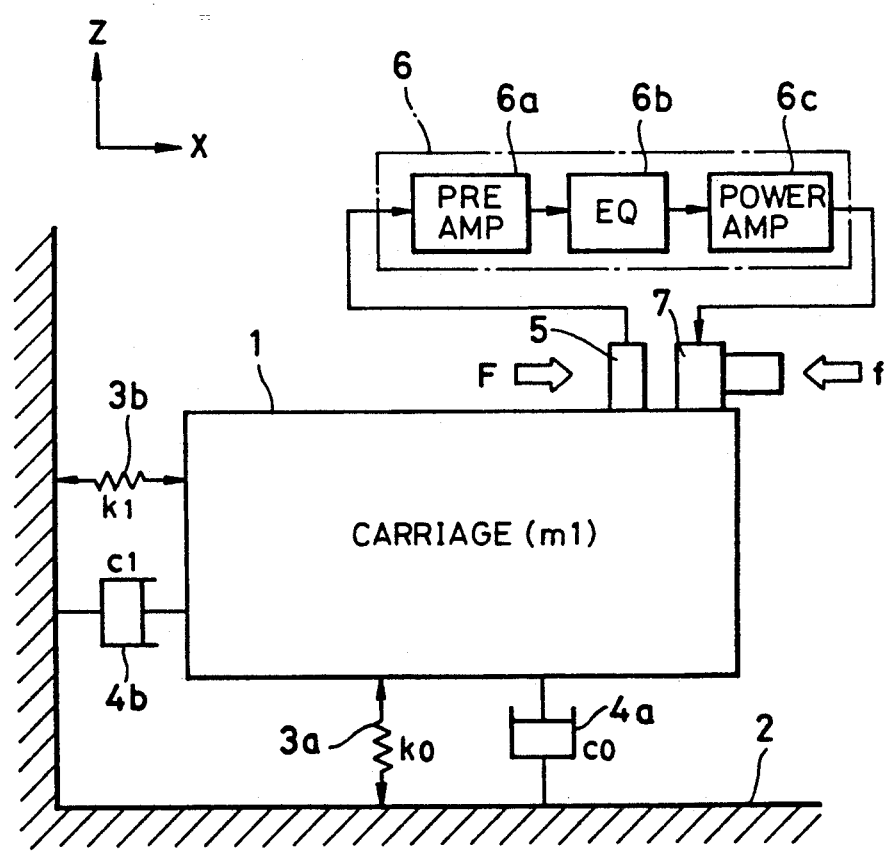
FIG. 2 is a schematic view of an object carriage system showing one embodiment of the present embodiment.

An object carriage system of the present invention will be described in more detail while referring to the accompanying drawings. As shown in FIG. 2, a carriage 1 is provided with an acceleration sensor 5 which is acceleration detecting means for producing an acceleration signal corresponding to the rate of acceleration. The acceleration signal is fed to a preamplifier 6a of a driver circuit 6 where it is amplified and transmitted to an equalizer 6b. The equalizer 6b is composed mainly of bandpass filters, not shown, and arranged for transmitting a particular range of frequencies of the acceleration signal to a power amplifier circuit 6c for power amplification. The power amplified signal is then supplied to a linear motor 7 mounted onto the carriage 1.

Figure 3:
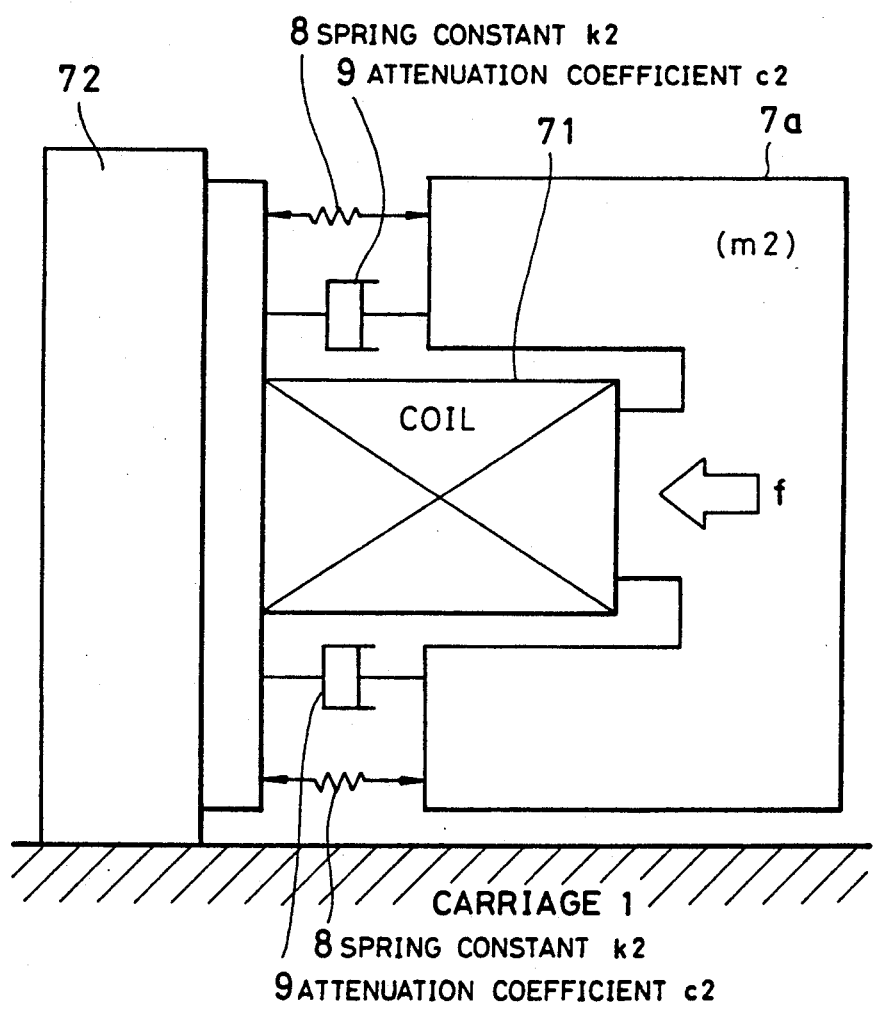
FIG. 3 is a schematic view of a linear motor 7 shown in FIG. 2.

As shown in FIG. 3, the linear motor 7 comprises a coil 71 to which the power amplified acceleration signal is fed and a coil support 72 fixedly mounted on the carriage 1 for sustaining the coil 71. An approximately E-shaped movable member 7a of the linear motor 7 is formed of a magnetic material and has a center projection thereof movably inserted into the coil 71 for movement in a direction denoted by the letter X in FIG. 2. More specifically, the movable member 7a having a mass of m2 can be moved in the direction in which the acceleration takes place in accordance with the acceleration signal supplied to driving means composed of the driver circuit 6 and the coil 71.

The mass m2 is smaller than the mass m1 of the carriage 1 and, for example, m2 is equivalent to 1/100 of m1. Also, a spring 8 having a spring constant k2 and a damper 9 having an attenuation coefficient c2 are interposed between the movable member 7a and the coil support 72.

The operation of a vibration suppressing unit composed of the acceleration sensor 5, the driver circuit 6, and the linear motor 7 will now be explained hereinunder. When a vibration, or force F is exerted to the carriage 1 in the X direction, the carriage 1 moves in the same direction with a rate of acceleration. The acceleration is then detected by the acceleration sensor 5 which in turn produces an acceleration signal and transmits it through the driver circuit 6 to the coil 71. Upon receiving the acceleration signal, the coil 71 generates an electromagnetic force which triggers a movement of the movable member 7a in the direction in which the vibration F takes place. Hence, the carriage 1 is urged by a counter-force f of the movable member 7a, as shown in FIG. 3. The counter-force f is applied opposite to the vibration F thus acting against the vibration F.

A servo-mechanism of the object carriage system is provided in the form of a secondary vibration system.

Figure 4:
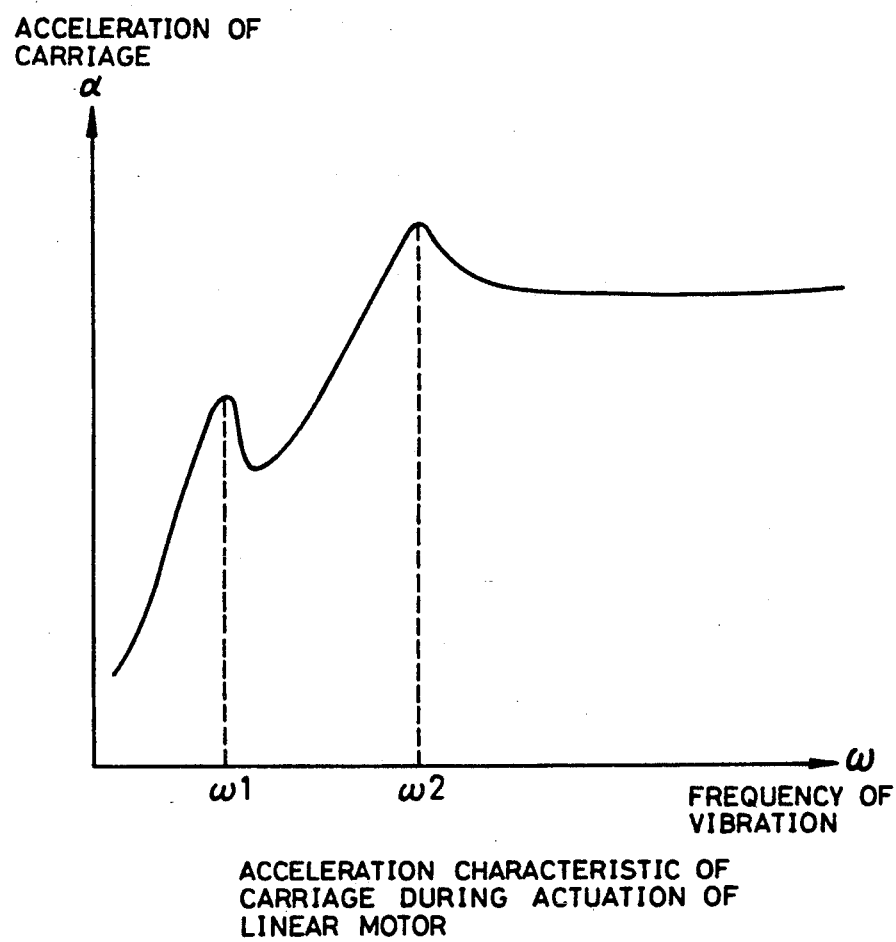
FIG. 4 is a diagram showing the characteristic of acceleration of the object carriage system with the linear motor 7, shown in FIG. 2, being activated.
Figure 5:
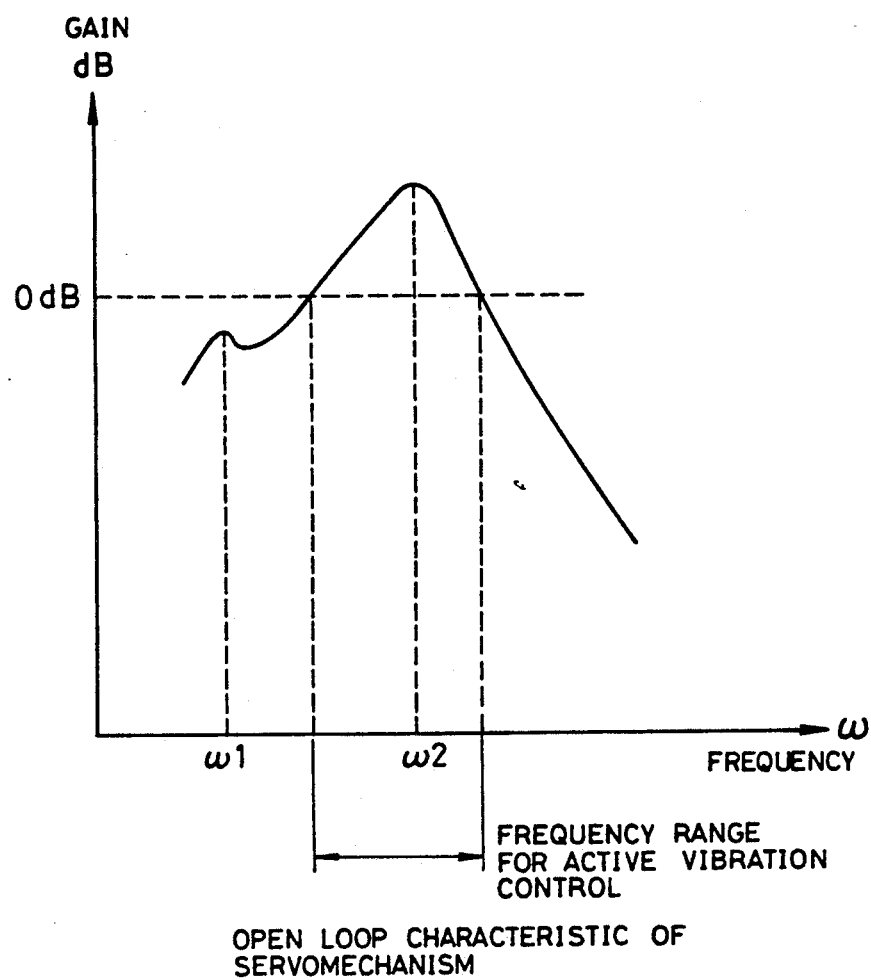
FIG. 5 is a diagram showing the open-loop characteristic of a servo-mechanism employed in the object carriage system shown in FIG. 2.

As apparent from the frequency response to acceleration of the carriage 1 during actuation of the linear motor 7, two peak points, $\omega_1$ and $\omega_2$, appear on the frequency curve as shown in FIG. 4. The peak $\omega_2$ is determined by the factors; the mass $m_2$ of the movable member 7a, the attenuation coefficient $c_2$, and the spring constant $k_2$. When the factors are properly assigned, the servo-mechanism is obtained which has a loop gain in a given range of frequencies about $\omega_2$. The optimum vibration suppression can be given by assigning $\omega_2$ to the frequency of the vibration F. Also, when the acceleration sensor 5 is arranged at the same height as of an acting point of the vibration F, no moments appear about the center of gravity of the carriage 1 and thus, a vibration in the Z direction will be attenuated.

Although the vibration in the X direction is suppressed by the foregoing embodiment, a vibration in the Z direction can be minimized through varying the direction of a movement of the movable member 7a. The vibration suppression unit of the present invention can easily be decreased in the overall size, and if desired, a plurality of the vibration suppression units will be mounted onto the carriage 1. For example, when six of such vibration suppression units are mounted on proper locations of the carriage 1 respectively, the vibration will be suppressed in six directions; the X, Z, and unshown Y directions and their rotating directions. Such arrangement is preferred in case the directions and positions where external disturbances and applied are unknown previously.

As set forth above, the object carriage system of the present invention can suppress any vibration, even if it contains a source of vibration, through detecting an acceleration caused by the vibration on a carriage which carries an object and actuating a mass movably supported by the carriage to move in the direction in which the acceleration takes place because of a force resulted from a vibration so that the carriage is urged by a counterforce which is oriented opposite to the acceleration.

What is claimed is:

1. An object carriage system having a carriage for carrying an object, a resilient supporting means for resiliently supporting the carriage over the floor, and a vibration suppressing means for suppressing the vibration of the carriage relative to the floor, the improvement comprising:
    acceleration detecting means for detecting an acceleration of said carriage and producing a corresponding acceleration signal;
    mass movably supported by said carriage; and
    driving means for driving said mass in the direction in which the acceleration takes place in accordance with the acceleration signal.

2. An object carriage system according to claim 1, wherein said mass is a magnetic member and said driving means contains an electromagnetic coil for exerting an electromagnetic force onto said magnetic member in accordance with said acceleration signal.

3. An object carriage system according to claim 1, wherein the object is a laser data writing device.

* * * * *